(12) United States Patent
Dorsch

(10) Patent No.: US 10,059,221 B2
(45) Date of Patent: Aug. 28, 2018

(54) ENERGY STORAGE ARRANGEMENT WITH TEMPERATURE DEPENDENT SWITCHING ON OF STATUS MONITORING

(71) Applicant: Audi AG, Ingolstadt (DE)

(72) Inventor: Johannes Dorsch, Ingolstadt (DE)

(73) Assignee: Audi AG, Ingolstadt (DE)

( * ) Notice: Subject to any disclaimer, the term of this patent is extended or adjusted under 35 U.S.C. 154(b) by 305 days.

(21) Appl. No.: 14/907,491

(22) PCT Filed: Jul. 8, 2014

(86) PCT No.: PCT/EP2014/001871
§ 371 (c)(1),
(2) Date: Jan. 25, 2016

(87) PCT Pub. No.: WO2015/010772
PCT Pub. Date: Jan. 29, 2015

(65) Prior Publication Data
US 2016/0159245 A1    Jun. 9, 2016

(30) Foreign Application Priority Data

Jul. 26, 2013 (DE) ........................ 10 2013 012 451

(51) Int. Cl.
*B60L 11/18* (2006.01)
*B60L 3/00* (2006.01)
(Continued)

(52) U.S. Cl.
CPC ......... *B60L 11/1872* (2013.01); *B60L 3/0046* (2013.01); *B60L 11/1874* (2013.01);
(Continued)

(58) Field of Classification Search
None
See application file for complete search history.

(56) References Cited

U.S. PATENT DOCUMENTS

| 3,601,679 A | 8/1971 | Braun et al. |
| 4,099,071 A * | 7/1978 | Thornburg ........... H03K 5/1506 257/467 |

(Continued)

FOREIGN PATENT DOCUMENTS

| CN | 103097177 | 5/2013 |
| DE | 36 41 616 A1 | 6/1988 |

(Continued)

OTHER PUBLICATIONS

International Search Report issued by the European Patent Office in International Application PCT/EP2014/001871.

(Continued)

*Primary Examiner* — Jared Fureman
*Assistant Examiner* — Aqeel Bukhari
(74) *Attorney, Agent, or Firm* — Henry M. Feiereisen

(57) ABSTRACT

An energy storage arrangement includes an electrical energy store, a control device which is assigned thereto and which, in the operating state, is designed to determine control information relevant to the operation of the energy store, and a switching device which is assigned to the control device and which, in the non-operating state of the control device, is designed to start up the control device, the switching device including at least one temperature-sensitive switching means which, when a specific threshold temperature is exceeded, at least one material property of the switching means changes in such a way that the control device is started up by way of the switching device.

20 Claims, 1 Drawing Sheet

(51) Int. Cl.
 H01M 10/42 (2006.01)
 H01M 10/48 (2006.01)
 H01M 10/613 (2014.01)
 H01M 10/625 (2014.01)
 H01M 10/63 (2014.01)

(52) U.S. Cl.
 CPC ....... H01M 10/425 (2013.01); H01M 10/486 (2013.01); H01M 10/613 (2015.04); H01M 10/625 (2015.04); H01M 10/63 (2015.04); B60L 2240/545 (2013.01); H01M 2010/4271 (2013.01); H01M 2220/20 (2013.01); Y02T 10/705 (2013.01); Y02T 10/7005 (2013.01)

(56) References Cited

U.S. PATENT DOCUMENTS

| | | |
|---|---|---|
| 6,002,240 A | 12/1999 | McMahan et al. |
| 2001/0002786 A1 | 6/2001 | Najima |
| 2004/0182183 A1 | 9/2004 | Brand et al. |
| 2007/0057752 A1* | 3/2007 | Wang ..................... H01H 37/58 335/37 |
| 2008/0278317 A1* | 11/2008 | Lin ........................ G06Q 10/00 340/539.24 |
| 2009/0206438 A1 | 8/2009 | Flohrs et al. |
| 2012/0242144 A1 | 9/2012 | Chorian et al. |
| 2014/0037998 A1* | 2/2014 | Zhu ....................... B60L 11/187 429/50 |

FOREIGN PATENT DOCUMENTS

| | | |
|---|---|---|
| DE | 101 31 259 A1 | 1/2003 |
| DE | 10 2004 007 681 A1 | 8/2004 |
| DE | 10 2004 048 607 A1 | 4/2006 |

OTHER PUBLICATIONS

Chinese Search Report dated Jan. 17. 2017 with respect to counterpart Chinese patent application 201480042024.1.
Translation of Chinese Search Report dated Jan. 17, 2017 with respect to counterpart Chinese patent application 201480042024.1.

\* cited by examiner

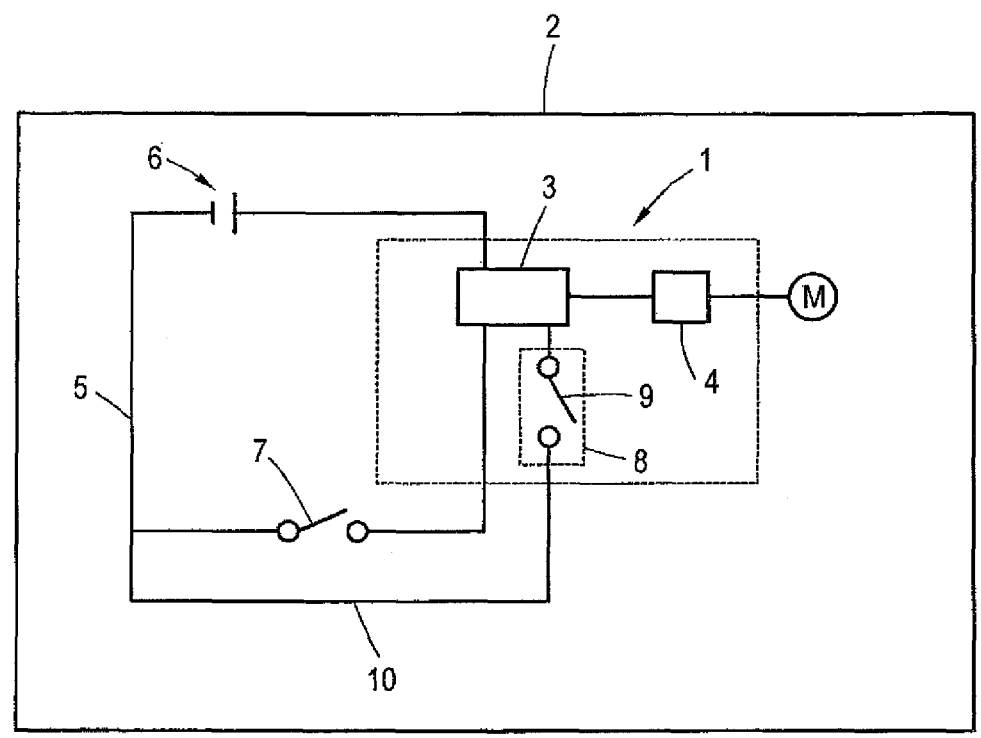

ENERGY STORAGE ARRANGEMENT WITH TEMPERATURE DEPENDENT SWITCHING ON OF STATUS MONITORING

CROSS-REFERENCES TO RELATED APPLICATIONS

This application is the U.S. National Stage of International Application No. PCT/EP2014/001871, filed Jul. 8, 2014, which designated the United States and has been published as International Publication No. WO 2015/010772 and which claims the priority of German Patent Application, Serial No. 10 2013 012 451.4, filed Jul. 26, 2013, pursuant to 35 U.S.C. 119(a)-(d).

BACKGROUND OF THE INVENTION

The invention relates to an energy storage arrangement, including an electric energy storage, a control device assigned to the energy storage which in the operating state is configured to determine items of control information relating to the operation of the energy storage, and a switching device assigned to the control device, and configured to cause the control device to change from the non-operating state to the operating state.

Such energy storage arrangements are known and are for example used in the motor vehicle technology, wherein the electric energy storage of the energy storage arrangement for example provides electric energy for an electric drive aggregate of the motor vehicle. The energy storage is typically controlled via a control device, which in the operating state determines corresponding items of control information relating for example to the charge state of the energy storage or charge- and discharge strategies of the energy storage etc. The items of control information are usually based on determining or monitoring a temperature of the energy storage. Determining or monitoring the temperature of the energy storage is important because the temperature plays a role in ageing processes of the energy storage and in particular in recognizing defects of the energy storage.

Corresponding items of control information and also a corresponding determining and monitoring the temperature of the energy storage are, however, only possible when energy is supplied, i.e., in the operating state or during operation of the control device. Therefore there is a need for a technical solution, in particular with regard to determining or monitoring the temperature, which enables determining and monitoring the temperature also when the control device is in a non-operating state.

SUMMARY OF THE INVENTION

The invention is therefore based on the object to set forth an improved energy storage arrangement.

The object is solved by an energy storage arrangement of the aforementioned type, which is characterized according to the invention in that the switching device includes at least one temperature sensitive switching means, which when exceeding a specific threshold temperature undergoes a change of at least one material property so that the switching device causes a startup of the control device.

The energy storage arrangement according to the invention includes a switching device, which in particular is assigned to the control device, and which can cause the control device to change from its non-operating state to its operating state. In the non-operation state the control device is typically not connected to the energy supply network or is not supplied with energy via an energy supply network. This can for example be because the energy supply network itself is not operating. The startup of the control device is realized via a switching means of the switching device, i.e., by corresponding switching processes of the switching means resulting from temperature-related changes of the material properties of the switching means. The switching means is configured or constructed so that at least one of its material properties changes when exceeding a specific threshold temperature, so that the switching device can effect the startup of the control device.

The switching means thus changes its material property (ies) in dependence on its temperature so as to indirectly or directly initiate operation of the control device. The switching device is insofar configured to startup the control device (solely) in dependence on the temperature of the switching means. This has the advantage that the control device does not have to be constantly in an operating state, i.e., activated, in order to determine corresponding items of control information, i.e., in particular a determining or monitoring the temperature of the energy storage. As a result it is not required to constantly maintain an energy supply network in operation, which supplies the control device with energy, in order to correspondingly supply the control device with electric energy. When the control device is in a non-operating state, i.e., deactivated, the material properties of the switching means change in response to excessive temperature development, i.e., in particular a temperature development which is associated with the switching means exceeding the switching-element-specific threshold temperature, so that the switching means causes startup i.e., activation of the control device. As explained below the temperature dependent change of one or multiple material properties can be an intrinsic property of the material of which the switching means is made.

The principle according to the invention thus enables to at least qualitatively determine or monitor the temperature of the energy storage, in particular also in situations in which the control device, which is actually provided for determining and monitoring the temperature, is not supplied with electric energy or is not in operation. This results from the fact that the control device is started up by the switching device or the switching means of the switching device when the switching means heats up to a temperature above the specific threshold temperature. As mentioned, in this case the material properties of the switching means change as a result of the structural configuration or construction of the switching means, which causes the switching means to act on the control device so as to startup the control device. The switching means thus "awakens" the control device, which can then for example determine or monitor the temperature of the energy storage and as the case may be perform required measures for cooling the energy storage.

The term change of the material properties of the switching means means according to the invention that a specific physical property or a specific physical behavior of the material of which the switching means is made changes in dependence of the temperature, i.e., in particular when exceeding the specific threshold temperature. As explained below, for example the magnetic behavior or the magnetic properties of the material of which the switching means is made can change in dependence on the temperature, i.e., in particular when exceeding the specific threshold temperature. It is also conceivable for example that the electric conductivity of the material of which the switching means is made changes in dependence on the temperature, i.e., in particular when exceeding the specific threshold temperature.

The term change of the material properties of the switching means can however also mean according to the invention that the dimensions and/or the shape and/or the volume of the switching means changes in dependence on the temperature, i.e., in particular when exceeding the specific threshold temperature. As explained below in particular the shape of the switching means can change in dependence of the temperature, i.e., in particular when exceeding the specific threshold temperature.

Advantageously multiple corresponding switching devices or switching means can be provided, which are preferably arranged distributed around the energy storage. This increases the reliability of the described principle.

The term energy storage means according to the invention an energy storage cell or multiple modularly or stack-like combined energy storage cells. The individual energy storage cells are typically received in a housing part. The control device, the switching device or the switching means of the switching device are also typically received in a housing part.

In a preferred embodiment of the invention at least one electric circuit via which the control device can be supplied with electric energy is closable or is closed via the change of the material property(ies) of the switching means. The switching device or the switching means assigned to the switching device is thus a part of an electric circuit to which the control device is also connected. The electric circuit in turn can be a part of an electric energy supply network to which also the control device is connected or via which the control device can be supplied with electric energy, i.e., is supplied during operation with electric energy. The control device is thus started up in that the control device is supplied with current by closing an electric circuit. Prior to its startup, i.e. in the non-operating state, the control device is therefore not supplied with electric energy. As explained below, depending on the respective embodiment of the switching means, different principles of closing the electric circuit as a result of the change of the material property(ies) of the switching means are possible.

Advantageously, when the control device is activated via closing the electric circuit, the control device is configured to perform at least one measure for tempering, in particular cooling, the energy storage and/or to output at least one item of warning information. In this context it is possible that upon closing the electric circuit a particular activating signal is generated in the control device, based on which a defined safety routine stored in the control device, for example by a particular algorithm, is executed, which includes the described processes, i.e., the performing of at least one measure for cooling the energy storage, which may also mean an extinguishing process, or the outputting of corresponding items of warning information. The electric circuit can thus form a part of a defined electric connection or signal input of the control device, which is present in addition to an electric connection or signal input via which the control device is supplied with electric energy or electric signals during operation. The control device can thus be connected to multiple electric circuits or multiple energy supply networks, wherein one electric circuit or one energy supply network is provided for supply of the control device during operation with electric energy, whereas another electric circuit or another energy supply network is provided for the startup of the control device according to the invention via the switching device. The latter described electric circuit is thus only closed when exceeding the specific threshold temperature of the switching means so that only in this case an energy supply of the control device is accomplished via this electric circuit, which in particular serves for activating and performing corresponding measures for temperature detection or monitoring and cooling of the energy storage.

The above-described warning information can be outputted via an output means of a device, which includes the energy storage arrangement, in particular a motor vehicle, and/or can be emitted to the environment of the device which includes the energy storage arrangement, in particular of a motor vehicle. Generally it is conceivable that the warning information is an acoustic and/or haptic and/or optical information or signal. The control device therefore communicates with corresponding output means such as loudspeakers, vibration devices, monitors etc. of the device, which includes the energy storage arrangement. The items of warning information are therefore typically directed toward an operator of the device. The items of warning information can, however, alternatively or in addition also be outputted to the environment of the device. This can for example be accomplished by outputting acoustic and/or optical information or signals to the environment of the device, i.e., in particular an environment of the vehicle. The device can thus for example output acoustic and/or optical signals to its environment. It is also conceivable to transmit the warning information via corresponding transmitters and/or receivers, i.e., in particular via a communication network, such as for example UMTS, WLAN etc. to corresponding objects in the vicinity of the device. When the device is a motor vehicle, i.e., the energy storage arrangement is part of a motor vehicle, it is therefore possible to transmit the warning information for example by means of so-called car2car communication to other motor vehicles in the vicinity of the vehicle. Generally the warning information can also be transmitted to other devices or communication partners connected to the communication network, such as emergency services, police, repair- or service shops or to a vehicle owner.

In an exemplary embodiment, the switching means can change its magnetic properties in dependence on the temperature, wherein below a specific threshold temperature it has (ferro)magnetic properties and above the specific threshold temperature it has no (ferro)magnetic properties. The switching means is thus made of a particular material that changes its magnetic properties in dependence of the temperature, i.e., when exceeding the specific threshold temperature, which is here referred to as Curie temperature or coincides with the curie temperature. The switching means can advantageously be incorporated into the described electric circuit for example in that below the specific threshold temperature the switching means interacts with a magnetic, electrically conducting element (switching means) of the electric circuit so that the element is positioned so that the electric circuit is opened or interrupted. Above the threshold temperature the magnetic electrically conducting element, due to the loss of the magnetic properties of the switching means and with this the no longer existing magnetic interaction with the switching means, is positioned so that the electric circuit is closed.

In this embodiment the switching means can for example be made of a nickel-iron alloy. The Curie temperature of the alloy can for example be in the range between 20 and 100° C., preferably in a range between 50 and 80° C. Of course other materials that behave similarly can generally also be used. Also the Curie temperature can generally be higher or lower.

In a further exemplary embodiment, the switching means can change its conductivity in dependence on the temperature, wherein below the specific threshold temperature it has electrically insulating properties and above the specific threshold temperature it has electrically conductive properties. The switching means is thus made of a particular material that changes its electrical properties, i.e., in particular its electrical conductivity, in dependence on the temperature, i.e., when exceeding the specific threshold temperature. The switching means can advantageously be incorporated into the described electric circuit for example in that below the specific threshold temperature the switching means is electrically insulating so that the electric circuit is interrupted by the switching means. Above the specific threshold temperature the switching means is electrically conducting, i.e., it acts as an electric conductor so that the electric circuit is closed.

In this embodiment the switching means can be made of a semiconductor, in particular hot conductor, preferably of $Fe_2O_3$, $ZnTiO_4$, $MgCr_2O_4$. The threshold temperature can also be in a range between 20 and 100° C., preferably in a range between 50 and 80° C. Of course also in this case other materials that display a comparable behavior can generally be used. Also in this case the threshold temperature can generally be higher or lower.

In a further exemplary embodiment, the switching means can be configured as a bimetal strip or can include a bimetal strip that undergoes a defined change in shape when exceeding the specific threshold temperature. Bimetal strips are typically made of two or more different metals fixedly connected to each other. The metals differ from each other regarding their thermal expansion coefficient and thus undergo different expansions in response to temperature, which typically leads to an overall bending of the bimetal strip. In this embodiment the switching means is thus made of different materials, which in dependence on the temperature, i.e., when exceeding the specific threshold temperature, undergo different longitudinal expansions and thus cause a change of shape of the switching means. The switching means can this case advantageously be incorporated into the described electric circuit for example in that below the specific threshold temperature the switching means assumes a shape in which the electric circuit is interrupted by the switching means or by an element (switching element) coupled with the switching means. Above the specific threshold temperature the switching means can assume a shape at which the electric circuit is closed by the switching means or an element coupled with the switching means.

In this embodiment the switching means can for example be made of a strip of zinc and a strip of steel connected with the strip of zinc or it can include corresponding strips, generally material sections. Also in this case the threshold temperature is within a range between 20 and 100° C., preferably in a range between 50 and 80° C. Of course also in this case other materials, in particular metals that display a similar behavior can generally also be used. Also the specific threshold temperature can generally be higher or lower.

The invention also relates to a motor vehicle, which includes at least one energy storage arrangement as described above. Thus all statements regarding the energy arrangement according to the invention and it's possible embodiments also apply to the motor vehicle according to the invention. The energy storage arrangement or the energy storage of the energy storage arrangement is in particular provided for supplying a drive aggregate of the motor vehicle such as for example an electric motor, with electric energy. The energy storage is thus preferably a traction battery.

BRIEF DESCRIPTION OF THE DRAWING

Other advantages, features and details of the invention will become apparent from the exemplary embodiments explained below and from the drawing. The sole FIGURE shows a schematic representation of an energy storage arrangement according to an exemplary embodiment of the invention as part of a motor vehicle.

DETAILED DESCRIPTION OF PREFERRED EMBODIMENTS

The FIGURE shows a schematic representation of an energy storage arrangement 1 according to an exemplary embodiment of the invention as part of a motor vehicle 2. The energy storage arrangement 1 includes a control device 3 and an energy storage 4, for example in the form of a rechargeable electric lithium ion battery. The energy storage 4 serves for supplying one or multiple drive aggregates of the motor vehicle, which are indicated by the schematically shown electric motor. The energy storage 4 is thus a traction battery.

In the operating state the control device 3 is configured to determine items of control information relating to the operation of the energy storage 4. Corresponding items of control information relate for example to the charge and discharge operation, i.e., in particular to corresponding charge and discharge strategies, of the energy storage 4. Corresponding items of control information also relate to the temperature or tempering, i.e., in particular the cooling required during operation, of the energy storage 4. As a consequence a temperature of the energy storage can be detected or monitored via the control device 3 so that the energy storage 4 can be protected during operation of the control device 3 from temperature-related ageing effects or damage.

During operation of the motor vehicle 2 the control device 3 is supplied with electric energy via an energy supply network 5 or onboard network of the motor vehicle 2. Beside diverse electric energy consuming loads (not shown), the energy supply network 5 also includes an energy storage 6, typically in the form of a so-called 12V battery, which supplies the control device 3 during operation with electric energy. During operation of the motor vehicle 2 the switching means 7, which for example indicates an ignition, is closed, the control device 3 is supplied with electric energy via the energy supply network 5. The operation of the control device 3 is insofar coupled to the operation of the motor vehicle 2, because only in this case an energy is supplied via the energy supply network 5 or the energy storage 6.

The energy storage arrangement 1 includes a switching device 8 assigned to the control device 3. The switching device 8 is configured to cause the control device 3 to change from a non-operating state to an operating state. For this the switching device 8 includes a temperature sensitive switching means 9, at least one material property of which changes when exceeding a specific threshold temperature so that the switching device 8 causes startup of the control device 3.

The thus initiated operation of the control device 3 is thus in particular entirely independent of whether or not the control device 3 is in an operating state. In particular the control device can also be started up via the switching device 8 also in cases in which the control device 3 is not supplied with electric energy via the energy supply network 5, which case is represented by the opened switching means 7.

As can be seen the switching device 8 is a part of an electric circuit, which in particular includes the lower branch 10 of the energy supply network 5. When the temperature sensitive switching means of the switching device 8 has a temperature below the specific threshold temperature, the electric circuit is open or interrupted, i.e., the control device 3 is not supplied with electric energy via the branch 10 when exceeding the specific threshold temperature the switching means 9 changes one or multiple of tits material properties so that the electric circuit is closed and the control device 3 is activated via the switching device 8 and the operation of the control device 3 is ensured.

When activated via the switching device 7, the control device 3 performs measures for tempering, in particular for cooling the energy storage 4. Alternatively or in addition items of warning information can be outputted via the control device 3. In this context it is possible that when closing the switching means 9 a particular activation signal is generated in the control device 3 on the basis of which a defined safety routine, stored in the control device 3, for example by a particular algorithm, is executed, which includes the described processes, i.e., performing at least one measure for cooling the energy storage 4, which may also include an extinguishing process or the outputting of corresponding items of warning information.

The electric circuit, which can be closed via the switching device 8 or the switching means 9 of the switching device, forms a defined electrical connection or signal input of the control device 3, which is present in addition to an electrical connection or signal input, via which the control device 3 during operation of the motor vehicle 2 is supplied with electric signals. The control device 3 is thus connected to multiple electric circuits, which respectively form a part of the energy supply network 5, wherein the electric circuit which includes the switching means 7 supplies the control device 3 with electric energy during operation of the motor vehicle 2 and the electric circuit which includes the switching device 8 is provided for initiating operation of the control device by means of the switching device 8. The circuit including the switching device is thus only closed when exceeding the specific threshold temperature of the switching means 9 so that via this electric circuit only in this case a supply of the control device 3 with energy occurs.

The items of warning information described above can be outputted via an output means of the motor vehicle 2, for example in the interior of the vehicle and/or to the environment of the motor vehicle 2. Generally it is conceivable that the warning information is an acoustic and/or haptic and/or optical information or signal output. The control device 3 therefore communicates with corresponding output means (not shown) of the motor vehicle such as loudspeakers, vibration devices, monitors etc. The warning information can, however, alternatively or in addition also be outputted to the environment of the motor vehicle 2. This can for example be accomplished by outputting acoustic and/or optical items of information or signals to the environment of motor vehicle. It is also conceivable to transmit the warning information via corresponding transmitters and/or receivers of the motor vehicle, i.e., in particular via a communication network such as for example UMTS, WLAN etc. to corresponding objects present in the vicinity of the motor vehicle. It is thus possible to transmit the warning information also to other devices for communication partners that are connected to the communication network such as emergency services, police, repair- or service shops or to the owner of the vehicle.

The change of the material properties of the switching means of the switching device 9 can include change of the magnetic properties of the switching means 9 in dependence on the temperature, wherein below the specific threshold temperature it has (ferro)magnetic properties and above the specific threshold temperature it has no (ferro)magnetic properties. The switching means 9 is thus made of a particular material, which changes its magnetic properties in dependence on the temperature, i.e., when exceeding the specific threshold temperature, which is here referred to as Curie temperature or coincides with the Curie temperature. The incorporation of the switching means 9 into the electric circuit can be accomplished in that below the specific threshold temperature the switching means 9 interacts with a magnetic electrically conductive element (switching means) of the electric circuit, which positions the element so that the electric circuit is opened or interrupted. Above the threshold temperature, due to the loss of the magnetic properties of the switching means 9 and thus the no longer existing magnetic interaction with the switching means 9, the element is positioned so that the electric circuit is closed. The switching means can for example be made of a nickel-iron alloy. The Curie temperature of the alloy is typically in a range between 20 and 100° C., preferably in a range between 50 and 80° C.

The change of the material property of the switching means 9 of the switching device 8 can also relate to the electric properties of the switching means 9. The switching means 9 can thus be configured to change its electric conductivity in dependence on the temperature, wherein below the specific threshold temperature it has electrically insulating properties and above the specific threshold temperature it has electrically conductive properties. The incorporation of the switching means 9 in the electric circuit can be accomplished in that below the specific threshold temperature the switching means 9 is electrically insulating, i.e., it acts a electric resistor, so that the electric circuit is interrupted by the switching means 9. Above the specific threshold temperature the switching means 9 is electrically conductive, i.e., it acts as electric conductor so that the electric circuit is closed. The switching means 9 can be made for example from a semiconductor, in particular hot conductor, preferably from $Fe_2O_3$, $ZnTiO_4$, $MgCr_2O_4$. The threshold temperature can also be in the range between 20 and 100° C., preferably in a range between 50 and 80° C.

The change of the material property of the switching means 9 of the switching device 8 can also be a change of shape of the switching means 9. The switching means 9 can therefore be made of a bimetal strip or can include a bimetal strip, which upon exceeding the specific threshold temperature undergoes a defined change in shape. In this embodiment, the switching means 9 is made of different materials that undergo different longitudinal expansions in dependence on the temperature, i.e., when exceeding the specific threshold temperature, and in this way cause a change of shape of the switching means 9. The incorporation of the switching means 9 into the electric circuit can be accomplished in that below the specific threshold temperature the switching means 9 assumes a shape at which the electric circuit is interrupted by the switching means 9 or an electrically conductive element coupled with the switching means 9. Above the specific threshold temperature the switching means 9 can assume a shape at which the electric circuit is closed by the switching means 9 or a corresponding element coupled with the switching means 9. The switching means 9 can in this case for example be formed by a strip or a material section of zinc, and a strip or material section of steel connected thereto. Also in this case the threshold temperature can be in a range between 20 and 100° C., preferably in a range between 50 and 80° C.

What is claimed is:

1. An energy storage arrangement, comprising:
   an electric energy storage;
   a control device assigned to the electric energy storage, said control device when in operation being configured to determine items of control information relating to the operation of the energy storage; and
   a switching device assigned to the control device, said switching device comprising at feast one temperature sensitive switching element, wherein at least one material property of the switching element changes when a temperature of the switching element exceeds a specific threshold temperature, thereby causing the control device to change from a non-operating state to an operating state.

2. The energy storage arrangement of claim 1, further comprising at least one electric circuit for supplying the control device with electric energy, wherein the change of the at least one material property of the switching element causes closure of the at least one electric circuit thereby causing the control device to assume the operating state.

3. The energy storage arrangement of claim 2, wherein the control device in the operating state is configured to perform at least one measure for tempering the energy storage, and/or to output at least one warning information.

4. The energy storage arrangement of claim 2, wherein the at least one measure for tempering is a cooling of the energy storage.

5. The energy storage arrangement of claim 3, for installation in an apparatus having output means adapted for outputting the warning information.

6. The energy storage arrangement of claim 5, wherein the output means are adapted for outputting the warning information to an environment of the apparatus.

7. The energy storage arrangement of claim 5, wherein the apparatus is a motor vehicle.

8. The energy storage arrangement of claim 1, wherein the at least one material property is a magnetic property of the switching element, wherein below the specific threshold temperature the switching element has ferromagnetic properties and below the specific threshold temperature the switching element has no ferromagnetic properties.

9. The energy arrangement of to claim 8, wherein the switching means is made of a nickel-iron alloy, and wherein a Curie temperature of the alloy is within arrange between 20 and 100° C.

10. The energy arrangement of to claim 9, wherein the Curie temperature is within a range between 50 and 80° C.

11. The energy storage arrangement of claim 1, wherein the at least one material property is an electric conductivity, wherein below the specific temperature the switching element has electrically insulating properties and above the specific threshold temperature the switching element has electrically conductive properties.

12. The energy storage arrangement of claim 11, wherein the switching element is made of a semiconductor.

13. The energy storage arrangement of claim 11, wherein the semiconductor is a hot conductor.

14. The energy storage arrangement of claim 11, wherein the switching element is made of one of $Fe_2O_3$, $ZnTiO_4$ and $MgCr_2O_4$.

15. The energy storage arrangement of claim 11, wherein the specific threshold temperature is within a range between 20 and 100° C.

16. The energy storage arrangement of claim 11, wherein the specific threshold temperature is within a range between 50 and 80° C.

17. The energy storage arrangement of claim 1, wherein the switching element is made of a bimetal strip or includes a bimetal strip, which when exceeding the specific threshold temperature undergoes a defined change in shape.

18. The energy storage arrangement of claim 17, wherein the threshold temperature is within a range between 20 and 100° C.

19. The energy storage arrangement of claim 17, wherein the threshold temperature is within a range between 50 and 80° C.

20. A motor vehicle, comprising an energy storage arrangement, said energy storage arrangement comprising an electric energy storage, a control device assigned to the electric energy storage, said control device when in operation being configured to determine items of control information relating to the operation of the energy storage; and a switching device assigned to the control device, said switching device comprising at least one temperature sensitive switching element, wherein at least one material property of the switching element changes when a temperature of the switching element exceeds a specific threshold temperature, thereby causing the control device to change from a non-operating state to an operating state.

* * * * *